Figure 1:
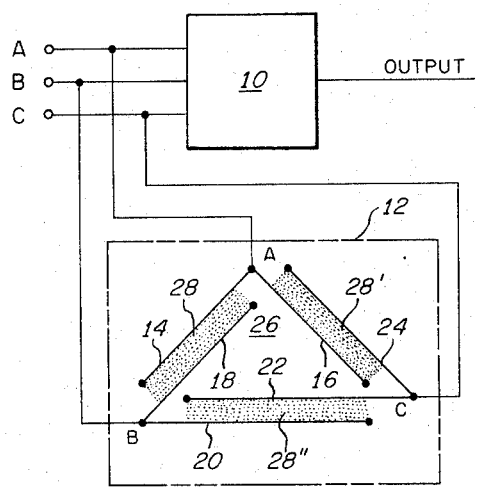

Oct. 25, 1966 P. E. SEIDEL 3,281,833
FAULT DETECTION INDICATOR
Filed Nov. 27, 1963 2 Sheets-Sheet 1

INVENTOR.
PAUL E. SEIDEL
BY
S.C. Yeaton
ATTORNEY

Oct. 25, 1966  P. E. SEIDEL  3,281,833
FAULT DETECTION INDICATOR
Filed Nov. 27, 1963  2 Sheets-Sheet 2

INVENTOR.
PAUL E. SEIDEL
BY
*S.C.Yeaton*
ATTORNEY

United States Patent Office 3,281,833
Patented Oct. 25, 1966

3,281,833
FAULT DETECTION INDICATOR
Paul E. Seidel, Brooklyn, N.Y., assignor to Sperry Rand Corporation, Great Neck, N.Y., a corporation of Delaware
Filed Nov. 27, 1963, Ser. No. 326,524
8 Claims. (Cl. 340—366)

This invention relates in general to fault detection indicators and in particular to indicators which operate to tell whether a fault has occurred in apparatus having a plurality of channels, each of which is adapted to handle the same form of signal. For example, the invention may be employed with majority logic circuits as might be employed in digital computing apparatus, such circuits comprising a plurality of redundant channels and a voting circuit. The voting circuit produces an output signal representative of the signal which appears in most of the channels, e.g. if in a three-redundant channel digital system ONES appear in two of the three channels (instead of in all channels) the voting circuit provides a ONE output. If, instead, two of the three channels have ZEROS (where all three channels should have ZEROS therein) the voting circuit provide a ZERO output. For an example of a voting circuit that may be employed in a majority logic circuit monitorable for faults by the invention, reference should be had to Automatic Digital Computers, by M. V. Wilkes, John Wiley and Sons, New York, 1957, Fig. 6.29 on page 234.

The present invention operates to indicate not only when one redundant channel erroneously contains a signal different from the signals contained in the other channels, but serves also to indicate which of the channels is faulty. In providing the invention, use may be made of that class of chemical compositions known as oxidation-reduction indicators as defined in Textbook of Physical Chemistry, by Samuel Glasston, D. Van Nostrand Company, New York, 1946, on page 952. Each of these indicators is such that when it is exposed to an electric field, it ionizes and either reduces or oxidizes to form a new compound substantially permanently different in color from its original color.

Typical of these oxidation-reduction indicators are ferric ammonium sulfate and 10% sodium silicate $FeNH_4(SO_4)_2 + Na_2O.xSiO_2$; ferrous ammonium sulfate and sodium thiocyanate $Fe(NH_4)_2(SO_4)_2 + NaSCN$; potassium iodide and starch $KI + (C_6H_{10}O_5)_x$. To see how such oxidation-reduction indicators work, consider a solution containing potassium iodide and starch. By immersing electrodes in the solution and applying a potential difference across the electrodes, the potassium iodide is made to ionize. When this happens the iodide ions get reduced to form iodine which then attacks the starch to form, as is well-known, a compound having a characteristic blue color.

In a presently preferred form of the invention for monitoring three redundant channels, a stratum is provided. On the stratum are three "V's" of electrically conductive material, so placed, for example, by printed circuit techniques. The apex of each V is electrically brought out to a respective pin, and each leg of each V is placed parallel to and spaced apart from one leg of another V. In-between the parallel legs of each V a solution, e.g. in the form of a gel, containing one of the aforementioned oxidation-reduction indicators is deposited. Each apex is then marked, e.g. by the letters A, B and C, to indicate the three redundant channels being monitored. By electrically connecting the pin associated with the V apex designated by the letter A to one channel (hereafter deemed channel A) and connecting the pin associated with the V apex designated by the letter B to one of the remaining channels (hereafter deemed channel B), and connecting the pin designated by the letter C to the third channel (channel C), not only will faults be immediately registered by a color change, but the registration will be such that the indicator will actually "point" to the letter associated with the faulty channel. That is, assume channel A is faulty, i.e. it registers a ZERO when both other channels register ONES, and assume further that a ZERO is represented by zero volts and a ONE is represented by ten volts. Then, ten volts are applied respectively between each leg of the conductive V associated with the letter A and its associated parallel leg, causing the solution between both pairs of legs to color. As this happens, a colored V is provided which has its apex actually point to the letter designating the faulty channel, to wit, channel A. The parallel legs of the V's associated with the non-faulty channels B and C both have ten volts applied, and therefore the solution between them does not color.

While the invention so far has been described employing oxidation-reduction indicators, the invention may instead employ other media, e.g. neon, argon, etc. colorable in response to potential differences.

A principal object of the invention is to provide an indicator for registering electrical signal failures by means of colors.

Another object of the invention is to provide an indicator for use in showing not only the occurrence of an electrical signal failure in a multi-channel electrical system, but also to show which of such channels has failed.

Another object of the invention is to provide a signal failure monitor that employs oxidation-reduction indicators to tell which of a plurality of signal carrying channels has failed to operate properly.

Figure 2:
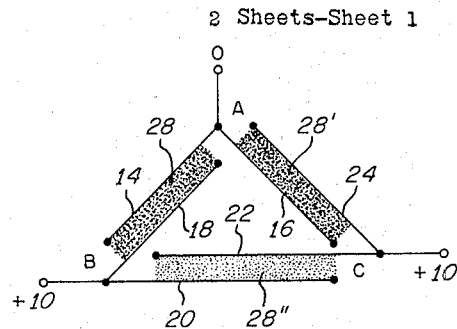
Figure 3:
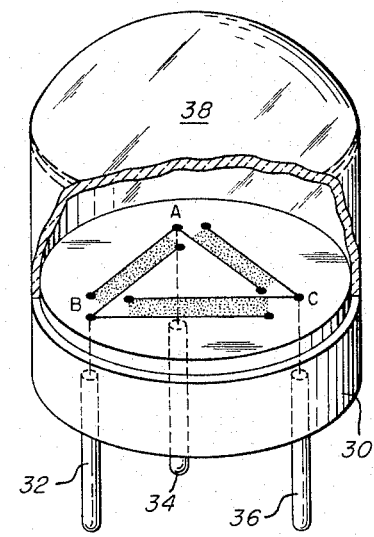
Figure 4:
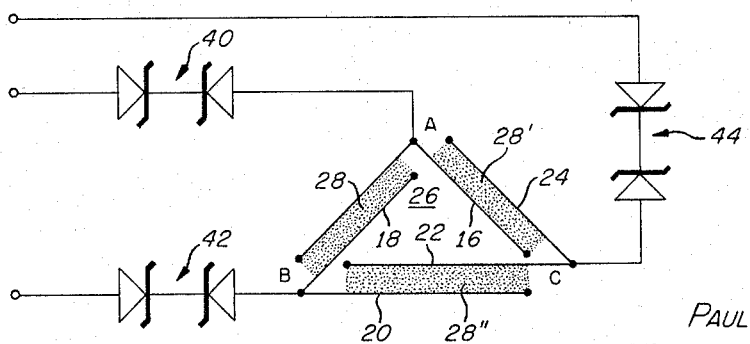
Figure 5:
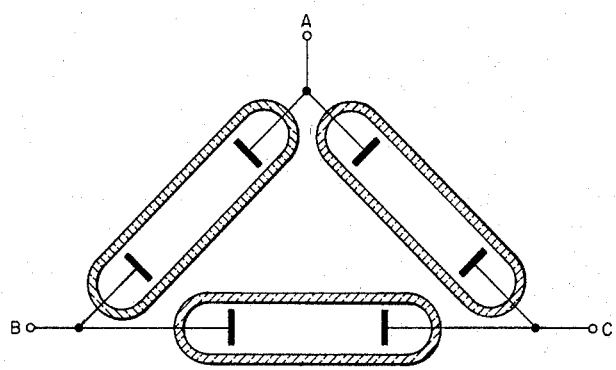
Figure 6:
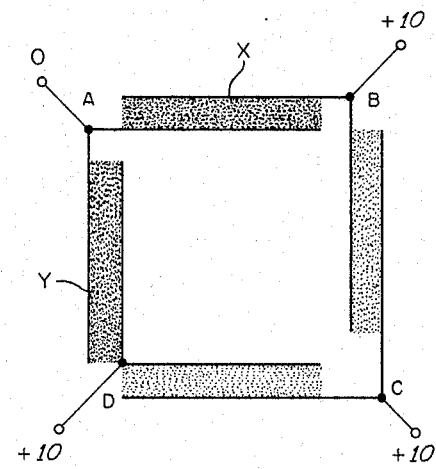
Figure 7:
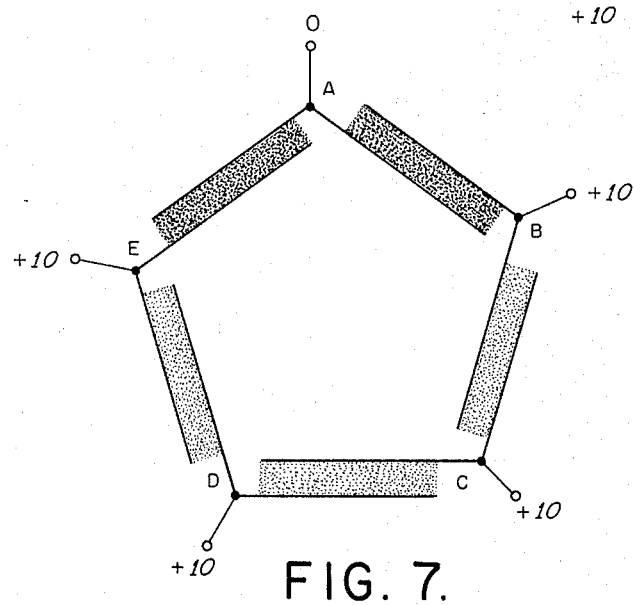

The invention will be described with reference to the figures wherein:

FIG. 1 is a schematic diagram showing how apparatus of the invention may be connected to monitor operation of a multi-channel system, FIG. 2 is a diagram useful in showing how the apparatus of FIG. 1 operates, FIG. 3 shows a presently preferred form of the invention, FIG. 4 is a schematic diagram of a circuit employing the invention, FIG. 5 is a schematic diagram of another embodiment of the invention, and FIGS. 6 and 7 are schematic presentations showing how the invention may be employed to monitor 4 and 5 redundant channel systems.

Referring to FIG. 1, three redundant channels A, B and C all of which are adapted to apply identical signals to a circuit 10, which may be like the aforementioned majority logic circuit, are connected also to apply their respective signals to a fault indicator 12. The signal in channel A is applied to a terminal marked "A" on the indicator 12, the signals in channels B and C being similarly applied to respective terminals marked "B" and "C" on the indicator. Each terminal A, B and C connects to the apex of a conductive V. For example, the terminal A connects to conductive legs 14 and 16; the terminal B to conductive legs 18 and 20; the terminal C to conductive legs 22 and 24. Each conductive leg of each V is then made to lie parallel to only one leg of one other conductive V, thereby providing three sets of parallel legs which form an indicating triangle the three corners of which "point" to the indicating letters associated with the three channels A, B and C in question. Between each pair of parallel legs a gel 28, 28′ and 28″ of an oxidation-reduction indicator is provided.

Refer now to FIG. 2 which shows dramatically, what happens when a monitored channel becomes faulty. With signals of say ten volts applied to most channels, i.e. the channels B and C, and none to channel A, potential differences appear across the parallel pairs of legs 14 and 18 and across the parallel pairs of legs 16 and 24. This causes the oxidation-reduction indicator gels 28 and 28' to color and "point" to terminal A which is indicative of the faulty channel. The conductive legs 20 and 22 both have identical signals applied to them and therefore the gel 28" does not color. Hence, there is no "pointing" to either of the channel indication letters B or C.

In FIG. 3, a presently preferred embodiment of the invention is shown comprising an electrically nonconductive stratum 30 having the three electrically conductive V's deposited thereon, e.g., by a printed circuit technique. The apex of each V is then electrically brought out and connected to a respective pin 32, 34 and 36. In this way the indicator may be plugged into a monitored circuit like most other electronic components. Enveloping the whole assembly is a glass cover 28 which serves both as a viewing glass and to prevent the indicating gels from being brushed away.

Now, assume that the ONE signal level is in actuality 10±2 volts, and that the potential needed across a pair of parallel legs to color its respective indicating gel is one volt. With such the case, the indicator, of say FIG. 1, will indicate faults when possibly there are none. That is, the signal on lines 14 and 16 could conceivably be 10+2 volts and the signals on legs 18 and 24 could be 10−2 volts, thereby exposing the gels 28 and 28' to four volt potential differences and causing them to color. To avoid such a possibility, the indicator of the invention may be modified to include additional circuit elements, or instead be connected into a suitable circuit, as shown by FIG. 4. With the apparatus of FIG. 4, all potential differences in the monitored channels which are under four volts are rendered ineffectual to color the gels. Pairs 40, 42 and 44 of serially connected, but oppositely biased, zener diodes are inserted serially between the conductive V's of the indicator and respective channels being monitored for faults. The zener diode pairs then provide thresholds which in the presently described form will be ±three volts. These three volt thesholds in cooperation with the potential of one volt needed to color the indicating gels will serve to prevent the indicator of the invention from "seeing" potentials which result solely from tolerances.

Obviously many modifications of the above-described apparatus are possible, and all within the scope of the invention. For example, each leg of each conductive V may be made rake-like with the spokes of each rake-like leg being extended between the spokes of its respective parallel leg, thereby providing better potential distribution along the legs with attendant even color distribution. Further, isolation resistors etc. may be connected serially between each channel and the indicator to limit current drawn by the indicator, e.g. on happening of a fault. Also, if desired, since each leg of each V is merely an electrode, the invention may be employed with other colorable media, e.g. each pair of parallel legs may be replaced by a neon bulb or the like as shown in FIG. 5. This then will work in substantially the same manner as the above-described apparatus to indicate faulty channels.

The invention may likewise be employed to monitor multi-channel systems which comprise more than three redundant channels. See for example FIGS. 6 and 7. In FIG. 6, an indicator for monitoring four redundant channels has four conductive V's interlaced to form a square, each side of which comprises a single pair of parallel legs containing therebetween a color indicating gel. Should, as is shown, the channel associated with terminal A be faulty, the gels X and Y will color to point to terminal A. In FIG. 7 a pentagon of conductive V's, each leg of which is interlaced with and is parallel to a leg of another V, will similarly point to the terminal associated with the faulty channel of a five redundant channel system.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A signal failure indicator comprising first, second and third conductive V's, one leg of said first V being adapted to be parallel one leg of said second V, and the other leg of said first V being adapted to be parallel one leg of said third V, means responsive to potential differences to change color situated between each pair of parallel legs, and means adapted to apply electrical signals to all said conductive V's, whereby when the signals received by said first conductive V is different from that received by both of said other V's, the means responsive to potential differences selectively colors to form a colored V that has its apex at the apex of said first V.

2. A warning indicator for use in monitoring multi-channel systems adapted to have substantially identical signals in each channel comprising a plurality of V's each being of a conductive material and being each for a respective channel, each leg of each V being adapted to lie parallel one leg of only one other V, thereby forming as many pairs of parallel legs as there are channels in said system and causing said pairs of parallel legs to cooperate to form generally a geometric configuration having corners equal in number to the number of said channels, means responsive to potential differences to change color, said means being deposited between the legs of each pair of parallel legs, and means for providing electrical connections between each V and a respective channel in said system, whereby when one channel has a signal different from the signal in said other channels the means responsive to potential differences between the two pairs of parallel legs which form to provide the corner coinciding with the apex associated with the faulty channel changes color.

3. A signal failure indicator for monitoring three redundant channels of a signal handling system comprising a stratum of electrically nonconductive material, first and second electrically conductive strips lying on said stratum and being disposed to form an angle therebetween, means for electrically connecting both said strips to receive the signal in one of said channels, third and fourth electrically conductive strips lying on said stratum and being disposed to form an angle therebetween, said third strip lying parallel to but not touching said first strip, means for electrically connecting both said third and fourth strips to receive the signal in the second of said channels, fifth and sixth electrically conductive strips lying on said stratum and being disposed to form an angle therebetween, said fifth strip lying parallel to but not touching said second strip, and said sixth strip lying parallel to but not touching said fourth strip, means for electrically connecting said fifth and sixth strips to receive the signal on the third of said channels, and means colorable in response to potential differences deposited to lie between each pair of said pairs of parallel strips.

4. The apparatus of claim 3 including transparent cover means for enveloping the face of said stratum having said strips thereon.

5. A signal failure indicator comprising first, second and third conductive V's, one leg of said first V being adapted to be parallel one leg of said second V, and the other leg of said first V being adapted to be parallel one leg of said third V, oxidation-reduction indicator material between each pair of parallel legs, and means adapted to apply electrical signals to all said conductive V's, whereby when the signals received by said first conductive V is different from that received by both of said other V's the oxidation-reduction indicator material selectively colors to form a colored V that has its apex at the apex of said first V.

6. A warning indicator for use in monitoring multi-channel systems adapted to have substantially identical signals in each channel comprising a plurality of V's each being of a conductive material and being each for a respective channel, each leg of each V being adapted to lie parallel one leg of only one other V, thereby forming as many pairs of parallel legs as there are channels in said system and causing said pairs of parallel legs to cooperate to form generally a geometric configuration having corners equal in number to the number of said channels, oxidation-reduction indicator material deposited between the legs of each pair of parallel legs, and means for providing electrical connections between each V and respective channel in said system, whereby when one channel has a signal different from the signal in said other channels, the oxidation-reduction indicator material between the two pairs of parallel legs which form to provide the corner coinciding with the apex associated with the faulty channel colors.

7. A signal failure indicator for monitoring three redundant channels of a signal handling system comprising a stratum of electrically non-conductive material, first and second electrically conductive strips lying on said stratum and being disposed to form an angle therebetween, means for electrically connecting both said strips to receive the signal in one of said channels, third and fourth electrically conductive strips lying on said stratum and being disposed to form an angle therebetween, said third strip lying parallel to but not touching said first strip, means for electrically connecting both said third and fourth strips to receive the signal in the second of said channels, fifth and sixth electrically conductive strips lying on said stratum and being disposed to form an angle therebetween, said fifth strip lying parallel to but not touching said second strip, and said sixth strip lying parallel to but not touching said fourth strip, means for electrically connecting said fifth and sixth strips to receive the signal on the third of said channels, and oxidation-reduction indicator material deposited to lie between each pair of said pairs of parallel strips.

8. A failure warning indicator for a given plurality of signals comprising a plurality of elongated elements each having one pair of electrodes and containing means disposed to color when potential differences appear across their respective electrodes, means supporting said elements so that they lie in angular relationships with respect to each other and form generally a geometric configuration having that same given plurality of corners, and means electrically connecting one electrode of each elongated element to only one electrode of one other elongated element to form a plurality of pairs of connected electrodes, each of said pairs of connected electrodes being adapted to have applied thereto a respective signal.

No references cited.

NEIL C. READ, *Primary Examiner.*

D. K. MYER, *Assistant Examiner.*